(12) United States Patent
Dietz et al.

(10) Patent No.: US 8,064,347 B2
(45) Date of Patent: Nov. 22, 2011

(54) SYSTEM AND METHOD FOR REDUNDANT SWITCHED COMMUNICATIONS

(75) Inventors: David A. Dietz, Scottsdale, AZ (US); Brett A. Eddy, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1078 days.

(21) Appl. No.: 11/393,931

(22) Filed: Mar. 29, 2006

(65) Prior Publication Data

US 2007/0230330 A1 Oct. 4, 2007

(51) Int. Cl.
*H04J 1/16* (2006.01)
(52) U.S. Cl. .............................. 370/241; 370/252; 701/3
(58) Field of Classification Search .................. 370/241, 370/225, 250, 252, 389, 401, 466, 400, 216, 370/217, 218, 219, 220, 221, 254, 351, 355, 370/358, 402, 422; 701/3, 4, 10, 16
See application file for complete search history.

(56) References Cited

U.S. PATENT DOCUMENTS

| | | | | | |
|---|---|---|---|---|---|
| 4,918,619 | A | * | 4/1990 | Orloff et al. ..................... 702/52 |
| 5,355,512 | A | * | 10/1994 | Profera, Jr. .................... 455/13.3 |
| 7,376,088 | B2 | * | 5/2008 | Gambardella et al. ........ 370/252 |
| 7,483,382 | B1 | * | 1/2009 | Toillon et al. ................. 370/242 |
| 2003/0095367 | A1 | * | 5/2003 | Mares et al. ................. 361/93.7 |
| 2003/0152077 | A1 | * | 8/2003 | Saint Etienne et al. ....... 370/389 |
| 2003/0182404 | A1 | * | 9/2003 | Saint-Etienne et al. ...... 709/220 |
| 2004/0208545 | A1 | | 10/2004 | Langari et al. .................. 398/48 |
| 2005/0065669 | A1 | * | 3/2005 | Roux et al. ........................ 701/3 |
| 2005/0125182 | A1 | * | 6/2005 | Mao et al. ...................... 702/108 |
| 2005/0156777 | A1 | * | 7/2005 | King et al. ........................ 342/29 |
| 2005/0220029 | A1 | * | 10/2005 | Calluaud et al. ............... 370/241 |
| 2006/0062143 | A1 | * | 3/2006 | Bibby et al. .................... 370/225 |
| 2006/0101296 | A1 | * | 5/2006 | Mares et al. .................... 713/300 |
| 2006/0215568 | A1 | * | 9/2006 | Smith ........................... 370/241 |
| 2006/0293805 | A1 | * | 12/2006 | Garcia ............................. 701/16 |
| 2007/0027589 | A1 | * | 2/2007 | Brinkley et al. .................. 701/3 |
| 2007/0032920 | A1 | * | 2/2007 | Dapp et al. ........................ 701/3 |
| 2007/0127460 | A1 | * | 6/2007 | Wilber et al. .................. 370/389 |
| 2007/0127521 | A1 | * | 6/2007 | Sandell et al. ................. 370/466 |
| 2007/0183435 | A1 | * | 8/2007 | Kettering et al. .............. 370/401 |

FOREIGN PATENT DOCUMENTS

| EP | 0 687 123 A2 | 6/1995 |
|---|---|---|
| WO | WO 02/11341 A2 | 2/2002 |

OTHER PUBLICATIONS

European Search Report for 07105154.4-2416 dated Sep. 7, 2007.

* cited by examiner

*Primary Examiner* — Aung S Moe
*Assistant Examiner* — Abdullah Riyami
(74) *Attorney, Agent, or Firm* — Fogg & Powers LLC

(57) ABSTRACT

Apparatus, systems, and methods are provided for redundant switched communications among end users in a network. The apparatus includes an interface for coupling to a corresponding end user, a first channel for processing a communication from the end user, a second channel for processing the communication, and a multiplexer coupled to the interface and the first and second channels. The multiplexer selects at least one of the first and second channels to transmit the communication. The method includes receiving a data communication via first and second switches, each of the first and second switches having first and second channels, and routing the data communication through at least one of the first and second channels of the first and second switches.

16 Claims, 2 Drawing Sheets

US 8,064,347 B2

SYSTEM AND METHOD FOR REDUNDANT SWITCHED COMMUNICATIONS

FIELD OF THE INVENTION

The present invention generally relates to avionics networks, and more particularly relates to redundant avionics networks.

BACKGROUND OF THE INVENTION

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. The Ethernet network is typically composed of different equipment that subscribes to the network and connects to each other through switches. Each network subscriber can send packets in digital form generally at any time to one or more other subscribers. When a switch receives the packets, the destination equipment is determined, and the packets are switched to such equipment. In a switched full-duplex Ethernet type network, the term "full-duplex" refers to sending and receiving packets at a same time on a same link, and the term "switched" refers to the packets being switched in switches on appropriate outputs.

Avionic systems generally include numerous components that may exchange data among one or more other components. For example, a variety of external sensors may gather information that is routed via an avionics network to a number of different aircraft components. In avionic systems, redundant networks are common design considerations. More recently, Ethernet networks have been used in avionic network environments. For example, Aeronautical Radio Inc. (ARINC) 664 regarding avionics full duplex switch Ethernet networks, or more commonly referred to as AFDX, sets forth an aeronautical standard that defines a dual redundant avionics network for use in an aircraft environment.

In an aircraft environment, any number of different line replaceable units (LRUs) may be connected to an avionic network. One method of connecting an LRU to a network is using either an "A" network, a "B" network, or both networks to transmit and receive messages. Messages sent on both networks, such as an original message and a redundant copy of the original message, are typically selected at the destination end system using "First Arrival Wins," and the redundant copy may be discarded.

When connecting an LRU to an AFDX network, a common method is to couple the LRU via point-to-point wiring to a switch of each of the "A" and "B" networks. This method generally creates a significant number of connections to the AFDX network that results in an equally significant cost for each port and wiring that is associated with each connection. Each of the switches may be designed to couple to more than one LRU. In the event of failure of one of the switches (e.g., the "A" network switch), communication may continue among the LRUs coupled to the other switch (e.g., the "B" network switch). In some configurations, the destination LRU is coupled to switches of the "A" and "B" network (e.g., a second switch of each of the "A" and "B" networks) that are different than the respective switches of the "A" and "B" network that are coupled to the origination LRU. These "A" and "B" network switches of the destination LRU are in turn coupled to the "A" and "B" network switches, respectively, of the origination LRU, such as via a communication bus. When one of the switches coupled to the origination LRU fails (e.g., the "A" network switch), the message may be transmitted to the destination LRU using the other switch (e.g., the "B" network switch). When both switches coupled to the origination LRU fail, the origination is prevented from communicating with the destination LRU.

Accordingly, it is desirable to provide a redundant avionics network having improved redundancy and capability to dispatch with one or more communication system failures. It is also desirable to method for switching communications in an avionics network having improved redundancy and capability to dispatch with one or more communication failures. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus, system, and method are provided for dual redundant avionics networks. In an exemplary embodiment, an apparatus for switching communications from one or more end users in a network is provided comprising an interface, a first switch channel, a second switch channel, and a multiplexer. The interface has a first input for coupling to one of the one or more end users. Each of the first and second switch channels has an input coupled to the interface and has an output coupled to a multiplexer associated with the interface. Each of the first and second switch channels is configured to process a communication from the end users. The multiplexer has an output coupled to the interface and is configured to select at least one of the first and second switch channels to transmit the communication.

In another exemplary embodiment, a system for switching communication among end users in a network is provided comprising a first switch for routing a communication from first and second sets of the end users, and a second switch for routing the communication from the first and second sets of end users. The first switch comprises a first set of interfaces each coupled to a corresponding one of the first and second sets of end users, and a first pair of channels coupled to each of the first set of interfaces. Each channel of the first pair of channels is configured to process the communication. The second switch comprises a second set of interfaces each coupled to the corresponding one of the first and second sets of end users, and a second pair of channels coupled to each of the set of second interfaces. Each channel of the second pair of channels is configured to process the communication.

In another exemplary embodiment, a method for controlling communication in an avionic network is provided comprising receiving at least one data communication via a first switch while receiving the at least one data communication via a second switch, each of the first and second switches having first and second channels, and routing the at least one data communication through at least one of the first and second channels of the first and second switches.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
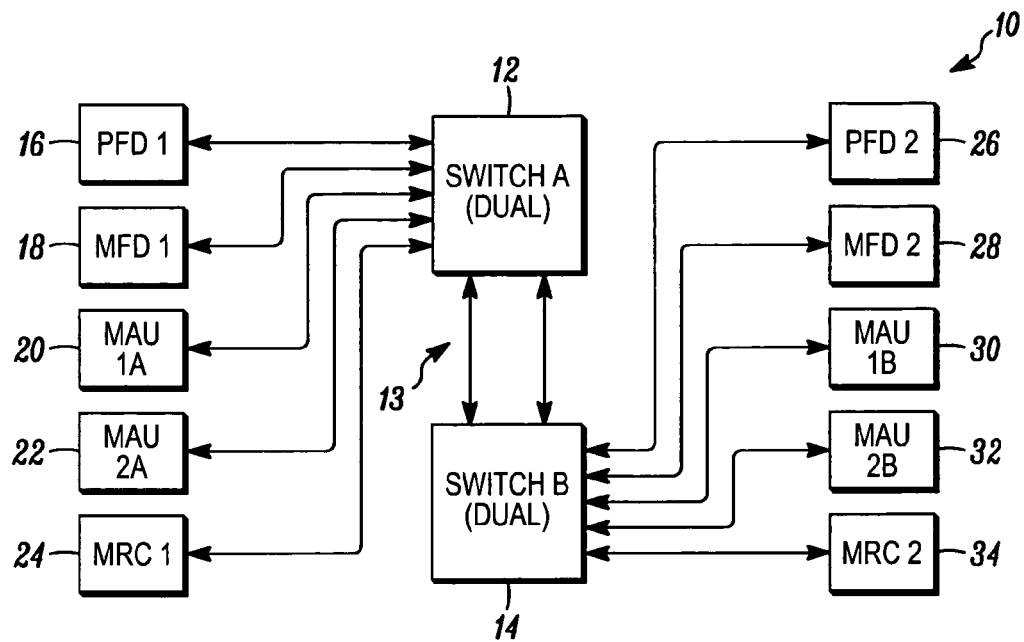
FIG. 1 is a block diagram of an exemplary embodiment of an avionic communication system.

Referring to the drawings, FIG. 1 is a block diagram of an exemplary embodiment of an avionic communication system 10. The avionic communication system 10 is an Ethernet type network comprising a first switch (switch A) 12, a second switch (switch B) 14 coupled to the first switch 12, such as via a communication bus 13, a first set of line replaceable units (LRUs), such as a primary flight display (PFD) 16, coupled to the first switch 12, and a second set of LRUs coupled to the second switch 14. Although two switches 12, 14 are described with the avionic communication system 10, the avionic communication system 10 may include additional switches that are coupled to one or both of the switches 12, 14. For example, each of the switches 12, 14 may be coupled to various network components such as processors, avionic instruments, and the like.

An LRU can be any of a variety of devices used in an avionics network environment, such as a sensor, a switch, an avionic instrument, etc. In this exemplary embodiment, the first set of LRUs comprises a PFD (PFD1) 16, a multi-function display (MFD) (MFD1) 18, a first modular avionics unit (MAU) (MAU1A) 20, a second MAU (MAU2A), and a modular radio cabinet (MRC) (MRC1) 24 that are each coupled to the first switch 12. The second set of LRUs comprises a PFD (PFD2) 26, an MFD (MFD2) 28, a first MAU (MAU1B) 30, a second MAU (MAU2B) 32, and an MRC (MRC2) 34 that are each coupled to the second switch 14. The number and type of LRUs that are coupled to the switches 12, 14 may vary.

Each of the switches 12, 14 include, but are not necessarily limited to, one or more physical connection points (e.g., a port) for each of the respective LRUs, and dual channels coupled to each of the ports of the respective switch 12 and 14. Each port of the switches 12 and 14 is coupled to a corresponding LRU. In this exemplary embodiment, the switch 12 has a separate port for each of PFD1 16, MFD1 18, MAU1A 20, MAU2A 22, and MRC1 24 to total five (5) ports, and the switch 14 has a separate port for each of PFD2 26, MFD2 28, MAU1B 30, MAU2B 32, and MRC2 34 to total to five (5) ports. Each of the LRUs has a point-to-point connection to the corresponding switch 12, 14. For example, each of PFD1 16, MFD1 18, MAU1A 20, MAU2A 22, and MRC1 24 has a point-to-point connection to a corresponding port of the switch 12, and each of PFD2 26, MFD2 28, MAU1B 30, MAU2B 32, and MRC2 34 has a point-to-point connection to a corresponding port the switch 14. The connections may be based on twisted wired pairs (e.g., one wire for transmission and one wire for reception), optical fibers, and the like. Each of the dual channels is configured to process data packets, received from the ports, independent of the other channel. In this exemplary embodiment, one of the channels continues to process communication transmitted to or received from the corresponding LRU when the other channel has a fault or fails.

Figure 2:
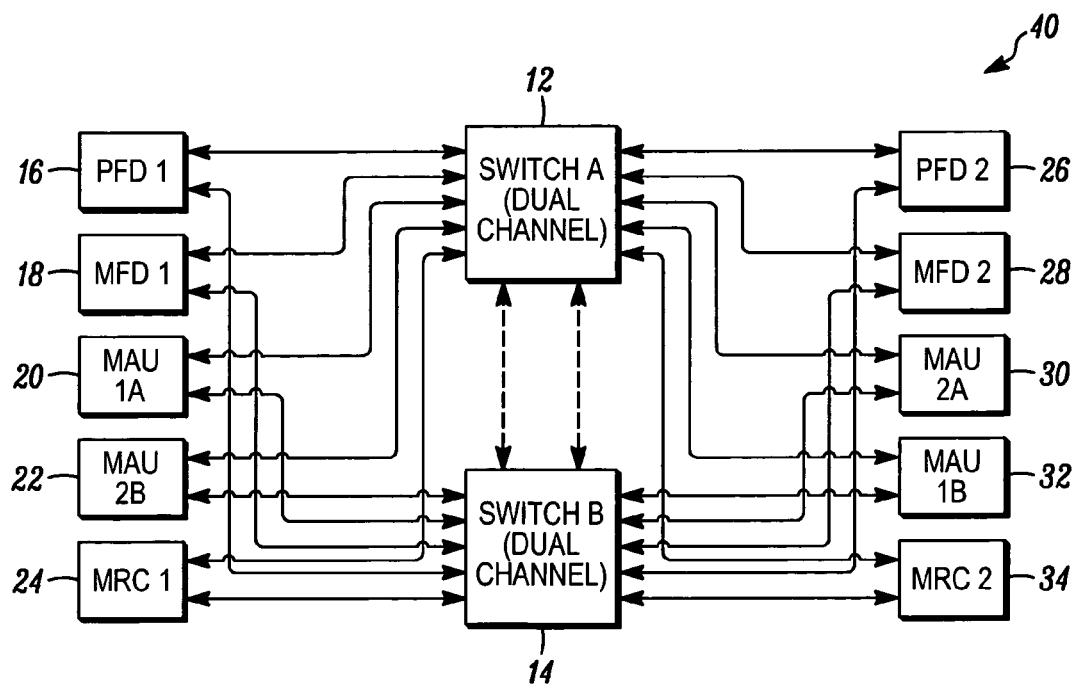
FIG. 2 is a block diagram of another exemplary embodiment of an avionic communication system.

FIG. 2 is a block diagram of another exemplary embodiment of an avionic communication system 40. In this exemplary embodiment, each of the switches 12 and 14 is coupled to both sets of LRUs. For example, each of the switches 12 and 14 is coupled to PFD1 16, MFD1 18, MAU1A 20, MAU2A 22, MRC1 24, PFD2 26, MFD2 28, MAU1B 30, MAU2B 32, and MRC2 34. The number of ports increases for each of the switches 12 and 14 to accommodate both sets of LRUs. For example, each of the switches 12 and 14 has a separate port for each of PFD1 16, MFD1 18, MAU1A 20, MAU2A 22, MRC1 24, PFD2 26, MFD2 28, MAU1B 30, MAU2B 32, and MRC2 34 to total ten (10) ports for each of the switches 12 and 14. Each LRU in the avionic communication system 40 has two (2) corresponding ports (e.g., one port from the switch 12 and one port from the switch 14) and four (4) corresponding channels (e.g., the dual channels coupled to the corresponding port in the switch 12 and the dual channels coupled to the corresponding port in the switch 14). The switches 12, 14 may be coupled to each other to establish a time base to synchronize the processing of communication in the communication system 40.

In this exemplary embodiment, in the unlikely event one of the ports (e.g., the corresponding port in the switch 12) coupled to a particular LRU in this avionic communication system 40 becomes inoperable, the other port (e.g., the corresponding port in the switch 14) continues to route communication to and from this LRU. For example, if the port in the switch 12 that is coupled to PFD1 16 becomes inoperable, the port in the switch 14, that is coupled to PFD1, continues to route communication to and from PFD1 16. If one of the four corresponding channels (e.g., one of the dual channels coupled to the corresponding port in the switch 12 or one of the dual channels coupled to the corresponding port in the switch 14) becomes inoperable, one of the other three channels continues to process communication to or from the corresponding LRU. For example, if one of the dual channels in the switch 12 becomes inoperable, the other channel of the dual channels in the switch 12 or either channel of the dual channels in the switch 14 continues to process communication to or from PFD1 16.

In the unlikely event two of the four channels become inoperable, one of the other two channels continues to process communication to or from the corresponding LRU. For example, if both of the dual channels in the switch 12 become inoperable, either of the dual channels in the switch 14, that is coupled to PFD1 16, continues to process communication to or from PFD1 16. Additionally, if one channel from each of the dual channels in the switches 12 and 14 becomes inoperable, either of the other channels of the dual channels, that remains operable, continues to process communication to or from, PFD1 16. In the highly unlikely event that three channels become inoperable, the remaining channel continues to process communication to or from the corresponding LRU. This exemplary embodiment of the avionic communication system 40 is suited to serve LRUs having more critical functions.

Although the avionic communication system 10 shown in FIG. 1 is described with each of the LRUs having a single bi-directional connection with a corresponding switch (e.g., either switch A 12 or switch B 14) and the avionic communication system 40 shown in FIG. 2 is described with each of the LRUs having two bi-directional connections with the switches 12 and 14 (e.g., one connection with each of the switches 12, 14), one or more LRUs with single bi-directional connections and one or more LRUs with two bi-direction connections may be combined into an avionic communication system. This resulting avionic communication system has greater flexibility to accommodate a variety of LRUs (e.g., LRUs with varying degrees of system criticality).

Figure 3:
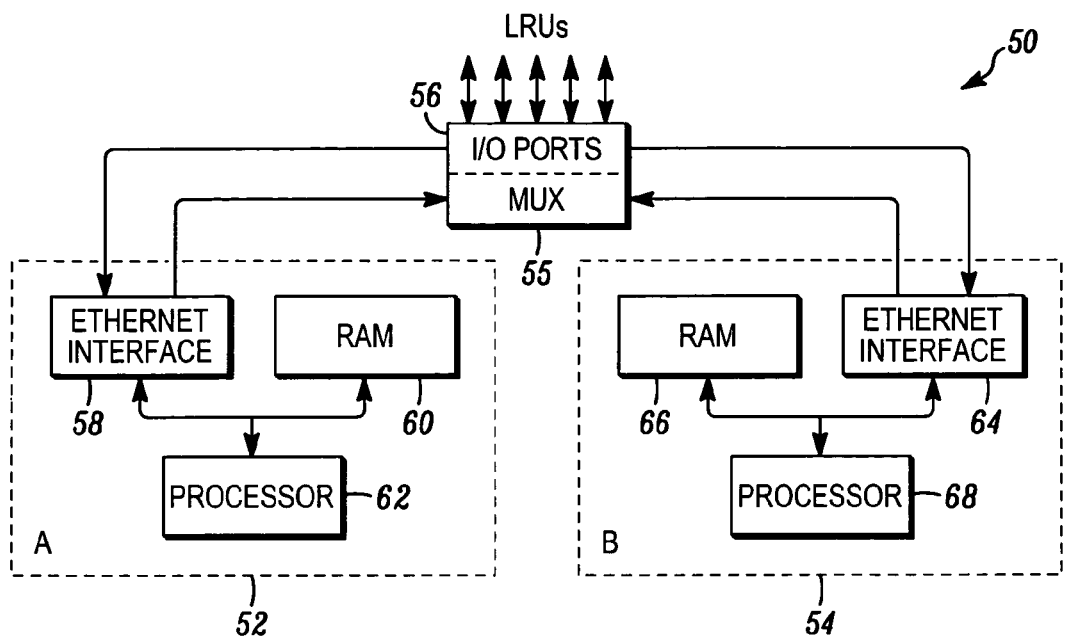
FIG. 3 is a block diagram illustrating an exemplary embodiment of the network switch shown in FIG. 1.

FIG. 3 is a block diagram illustrating an exemplary embodiment of a switch 50, such as the switches 12 or 14 shown in FIGS. 1 and 2. The switch 50 comprises a physical interface 56 having ports for coupling with one or more LRUs, a multiplexer 55 coupled to the interface 56, and first and second channels (e.g., A and B channels) 52, 54 each having an output coupled to the multiplexer 55 and having an input coupled to the physical interface 56. Each of the channels 52, 54 includes, but is not necessarily limited to, an Ethernet interface 58, 64, a memory 60, 66 respectively coupled to the Ethernet interface 58, 64, and a processor 62, 68 respectively coupled to the Ethernet interface 58, 64 and the memory 60, 66. Although the switch 50 is described with separate Ethernet interfaces 58 and 64, a single Ethernet interface may be coupled to both channels 52 and 54, such as may be incorporated with the multiplexer 55. In this exemplary embodiment, when receiving communication from an LRU, the physical interface 56 routes the communication to both channels 52 and 54 for processing. During transmission of communication, the multiplexer 55 selects one of the channels to couple to a particular port of the interface 56. In an exemplary embodiment, each of the channels 52, 54 is separately powered (e.g., by a separate power supply (not shown)) and is capable of independently processing data packets received from any LRU coupled to the switch 50 via the physical interface 56.

The Ethernet interfaces 58, 64 may contain various signal conditioning circuitry, an input/output (I/O) module, a media access control (MAC) module, and the like. The I/O module may include an Institute of Electrical and Electronics Engineers (IEEE) 802.3 signal conditioning module. IEEE 802.3 standards define a hardware layer and a transport layer of Ethernet. The MAC module performs frame data encapsulation/decapsulation, frame reception, and frame transmission associated with transmission along an Ethernet network, such as following IEEE 802.3.

Figure 4:
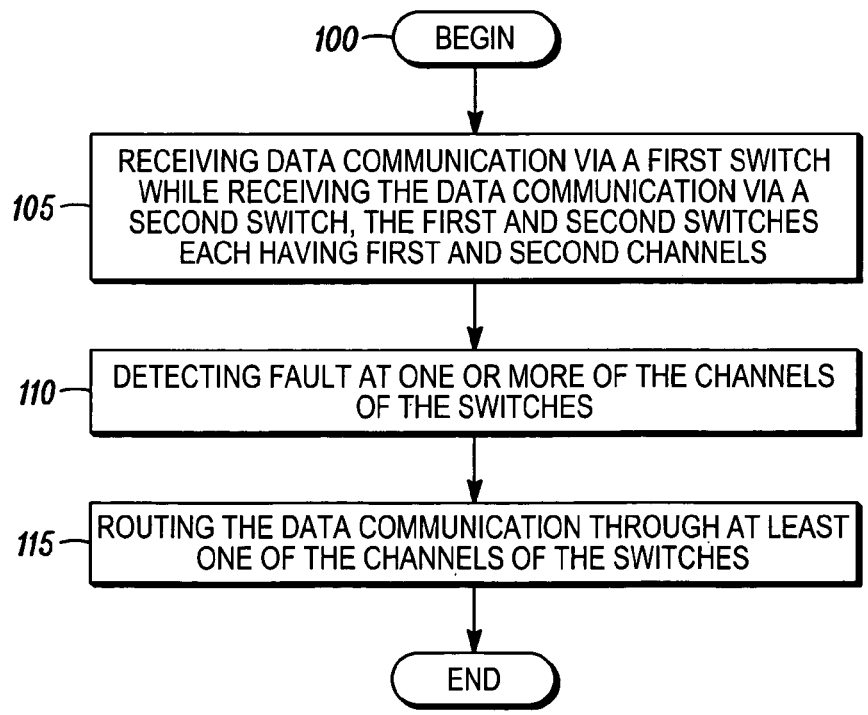
FIG. 4 is a flow diagram of an exemplary embodiment of a method for switching communication in an avionic network.

FIG. 4 is a flow diagram of an exemplary embodiment of a method 100 for switching communication in an avionic network. One or more data communications are received via a first switch while receiving the data communication(s) via a second switch at step 105. Each of the switches has an interface configured to receive the data communication from one or more LRUs. Each of the switches has first and second channels, coupled to a corresponding interface, that are each independently capable of processing the data communication. A fault is detected at one or more of the channels of the two switches at step 110. The data communication is routed through at least one of the channels of the two switches at step 115. In one exemplary embodiment, a data communication is received at one of the first and second switches, the data communication is processed through both channels of the corresponding switch, and one of the channels is selected to transmit the data communication. In another exemplary embodiment, a data communication is received at both of the first and second switches, the data communication is processed through both channels of one of the first and second switches, and one of the channels of this switch is selected to transmit the data communication. The data communication is processed through the second channel of the first switch when the first channel of the first switch is faulty. The data communication is processed through the first channel of the second switch when the first and second channels of the first switch are faulty. The data communication is processed through the second channel of the second switch when the first and second channels of the first switch and the first channel of the second switch are faulty. Additionally, the interface of the first switch receives the data communication when the interface of the second switch fails. The first and second switches may be synchronized during step 115 such as to accommodate Avionics Standard Communication Bus (ASCB) developed by Honeywell, Inc. ASCB provides access using a predefined schedule known to all nodes in the avionic network. For example, each node in the avionic network is synchronized to a common schedule and transmits during a corresponding time slot. Timing messages may be transmitted at the start of each frame to maintain synchronous transmissions. Using ASCB generally provides highly deterministic, low latency, and low jitter data transfer.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An apparatus for switching communications from one or more end users in a network, the apparatus comprising:
    an interface having a first input for receiving an avionic communication from an end user of the one or more end users and having a second input and an output, wherein at least one of the one or more end users comprises a line replaceable unit;
    a first switch channel having an input coupled to said output of said interface, said first switch channel configured to process said communication, said first switch channel comprising a first Ethernet interface having an output;
    a second switch channel having an input coupled to said output of said interface, said second switch channel configured to process said communication, said second switch channel comprising a second Ethernet interface having an output; and
    a single multiplexer coupled to said second input of said interface and to both of said outputs of said first and second Ethernet interfaces, said multiplexer configured to select at least one of said first and second switch channels to transmit said communication;
    wherein said multiplexer is configured to select said second switch channel to receive said communication when said first switch channel fails.

2. An apparatus according to claim 1, wherein said first switch channel further comprises:
    a first processor coupled to said first Ethernet interface;
    a first power supply coupled to said first processor; and
    a first memory coupled to said first processor.

3. An apparatus according to claim 1, wherein said second switch channel comprises:
    a second processor coupled to said second Ethernet interface;
    a second power supply coupled to said second processor; and
    a second memory coupled to said second processor.

4. An apparatus according to claim 1, wherein the line replaceable unit is configured to transmit/receive an Aeronautical Radio Inc. (ARINC) 664 data packet; and
  wherein said first switch channel and said second switch channel are configured to process said ARINC 664 data packet.

5. A system for switching communications among end users in a network, the system comprising:
  a first switch for routing an avionic communication from first and second sets of the end users, said first switch comprising:
    a first set of interfaces each coupled to a corresponding one of said first and second sets of end users;
    a first pair of channels coupled to each of said first set of interfaces, each channel of said first pair of channels comprising an Ethernet interface having an output and configured to process said communication; and
    a single multiplexer coupled to the output of each Ethernet interface of said first pair of channels;
  wherein a first channel of said first pair of channels is configured to process said communication when a second channel of said first pair of channels fails, and one or more of the end users comprises a line replaceable unit;
  a second switch for routing said communication from said first and second sets of end users, said second switch comprising:
    a second set of interfaces each coupled to said corresponding one of said first and second sets of end users;
    a second pair of channels coupled to each of said second set of interfaces, each channel of said second pair of channels comprising an Ethernet interface having an output and configured to process said communication; and
    a single multiplexer coupled to the output of each Ethernet interface of said second pair of channels;
  wherein a first channel of said second pair of channels is configured to process said communication when said first pair of channels fails.

6. A system according to claim 5, wherein said first switch is coupled to said second switch, and said first and second switches are synchronized together.

7. A system according to claim 5, wherein a first interface of said first set of interfaces is configured to receive said communication when a second interface of said second set of interfaces fails.

8. A system according to claim 5, wherein each channel of said first and second pairs of channels further comprises:
  a processor coupled to said Ethernet interface;
  a power supply coupled to said processor; and
  a memory coupled to said processor.

9. A system according to claim 5, wherein a first interface of said first set of interfaces is configured to couple to a first end user of said first set of end users and a second interface of said first set of interfaces is configured to couple to a first end user of said second set of end users;
  wherein a first interface of said second set of interfaces is configured to couple to said first end user of said first set of end users and a second interface of said second set of interfaces is configured to couple to said first end user of said second set of end users; and
  wherein said first and second switches are further configured to route said communication from said first end user of said first set of end users to said first end user of said second set of end users via said first and second interfaces of said first set of interfaces when one of said first and second interfaces of said second set of interfaces fails.

10. A system according to claim 9, wherein said first pair of channels is coupled to said first interface of said first set of interfaces and said second pair of channels is coupled to said second interface of said first set of interfaces;
  wherein a first pair of channels of said second set of pairs of channels is coupled to said first interface of said second set of interfaces and a second pair of channels of said second set of pairs of channels is coupled to said second interface of said second set of interfaces; and
  wherein said first and second switches are further configured to route said communication from said first end user of said first set of end users to said first end user of said second set of end users via at least one of said first pair of channels and at least one of said second pair of channels when one of said first and second interfaces of said second set of interfaces fails.

11. A method for controlling communication in an avionic network, the method comprising:
  receiving at least one avionic data communication at a line replaceable unit via a first switch while receiving the at least one avionic data communication via a second switch, each of the first and second switches having first and second channels, the first and second channels each comprising an Ethernet interface having an output, each of the first and second switches comprising a single multiplexer coupled to the output of each Ethernet interface; and
  routing the at least one avionic data communication through at least one of the first and second channels of the first and second switches; and
  processing the at least one avionic data communication through the second channel of the first switch when the first channel of the first switch is faulty.

12. A method according to claim 11, further comprising detecting a fault in at least one of the first and second channels of the first and second switches.

13. A method according to claim 11, further comprising processing the at least one avionic data communication through the first channel of the second switch when the first and second channels of the first switch are faulty.

14. A method according to claim 13, further comprising processing the at least one avionic data communication through the second channel of the second switch when the first and second channels of the first switch and the first channel of the second switch are faulty.

15. A method according to claim 11, wherein each of the first and second switches has an interface configured to receive the at least one avionic data communication, the first and second channels of the first and second switches coupled to a corresponding interface; and
  wherein the interface of the first switch receives the at least one avionic data communication when the interface of the second switch fails.

16. A method according to claim 11, further comprising synchronizing the first and second switches during said routing step.

* * * * *